United States Patent
Opuszko et al.

(10) Patent No.: US 7,935,401 B2
(45) Date of Patent: *May 3, 2011

(54) SHRINK SLEEVE LABEL

(75) Inventors: Slawomir Opuszko, Duncan, SC (US); Hubert J. Cook, Simpsonville, SC (US); Vincent W. Herran, Greenville, SC (US); Larry B. McAllister, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 1185 days.

This patent is subject to a terminal disclaimer.

(21) Appl. No.: 11/259,784

(22) Filed: Oct. 27, 2005

(65) Prior Publication Data
US 2007/0098933 A1 May 3, 2007

(51) Int. Cl.
*B32B 27/06* (2006.01)
*B32B 27/08* (2006.01)
*B32B 27/30* (2006.01)
*B32B 27/32* (2006.01)
*B32B 27/36* (2006.01)

(52) U.S. Cl. ............... 428/34.9; 428/34.1; 428/35.9; 428/36.9; 428/36.91; 428/480; 428/483; 428/522; 428/523; 525/222; 525/231; 525/240; 525/241

(58) Field of Classification Search ............ None
See application file for complete search history.

(56) References Cited

U.S. PATENT DOCUMENTS

| | | | |
|---|---|---|---|
| 4,087,588 A | 5/1978 | Shida et al. | |
| 4,537,836 A | 8/1985 | Aduretal. | |
| 4,581,262 A | 4/1986 | Karabedian | |
| 4,585,679 A | 4/1986 | Karabedian | |
| 4,626,455 A | 12/1986 | Karabedian | |
| 4,938,683 A | 7/1990 | Boice | |
| 4,985,300 A * | 1/1991 | Huang | 428/332 |
| 5,217,812 A | 6/1993 | Lee | |
| 5,443,765 A | 8/1995 | Yoshimura et al. | |
| 5,534,606 A * | 7/1996 | Bennett et al. | 526/281 |
| 5,583,192 A * | 12/1996 | Bennett et al. | 526/348.1 |
| 5,648,443 A * | 7/1997 | Okamoto et al. | 526/281 |
| 5,658,625 A | 8/1997 | Bradfute et al. | |
| 5,859,116 A * | 1/1999 | Shih | 524/493 |
| 5,912,070 A | 6/1999 | Miharu et al. | |
| 6,406,763 B1 * | 6/2002 | Wolf et al. | 428/34.9 |
| 6,423,421 B1 | 7/2002 | Banaszak et al. | |
| 6,479,138 B1 | 11/2002 | Childress | |
| 6,627,273 B2 * | 9/2003 | Wolf et al. | 428/34.9 |

(Continued)

FOREIGN PATENT DOCUMENTS

EP 1 388 559 2/2004

(Continued)

OTHER PUBLICATIONS

TOPAS: Thermoplastic Olefin Polymer of Amorphous Structure, Product Brochure, pp. 1-20, Ticona Corporation (Sep. 2004).

(Continued)

*Primary Examiner* — Vivian Chen
(74) *Attorney, Agent, or Firm* — Daniel B. Ruble (57) ABSTRACT

A shrink film comprises a skin layer and a base layer. The skin layer may comprise polystyrene or modified polyester. The base layer may comprise alpha-olefin/cyclic-olefin copolymer or alpha-olefin/vinyl aromatic copolymer. The film has a free shrink at 100° C. of at least about 10%. The film is useful for shrink sleeve applications.

46 Claims, 1 Drawing Sheet

U.S. PATENT DOCUMENTS

| | | | |
|---|---|---|---|
| 6,709,761 B2 | 3/2004 | Hirose et al. | |
| 6,743,523 B1 | 6/2004 | Woo et al. | |
| 6,852,806 B2 | 2/2005 | Sasagawa et al. | |
| 6,855,406 B2 | 2/2005 | Takayasu et al. | |
| 6,872,462 B2 | 3/2005 | Roberts et al. | |
| 7,160,604 B2 * | 1/2007 | Ginossatis | 428/212 |
| 7,645,505 B2 | 1/2010 | Bekele et al. | |
| 2002/0192412 A1 | 12/2002 | Satani et al. | |
| 2003/0039775 A1 | 2/2003 | Kong | |
| 2003/0068453 A1 * | 4/2003 | Kong | 428/35.2 |
| 2003/0152792 A1 | 8/2003 | Takayasu et al. | |
| 2004/0072002 A1 | 4/2004 | Hashioka et al. | |
| 2005/0142313 A1 | 6/2005 | Grah | |
| 2005/0255196 A1 | 11/2005 | Opuszko et al. | |
| 2006/0019112 A1 | 1/2006 | Holmes et al. | |
| 2006/0105166 A1 | 5/2006 | Lischefski et al. | |
| 2006/0251876 A1 | 11/2006 | Goerlitz et al. | |
| 2006/0275564 A1 | 12/2006 | Grah et al. | |
| 2007/0098933 A1 | 5/2007 | Opuszko et al. | |
| 2007/0172614 A1 | 7/2007 | Lee | |
| 2007/0254118 A1 | 11/2007 | Opusko et al. | |
| 2007/0275196 A1 | 11/2007 | Opuszko | |
| 2008/0026170 A1 | 1/2008 | Yamada et al. | |
| 2008/0075901 A1 | 3/2008 | Lee et al. | |
| 2008/0197540 A1 * | 8/2008 | McAllister et al. | 264/342 R |
| 2009/0280341 A1 | 11/2009 | Maruichi et al. | |
| 2010/0075164 A1 | 3/2010 | Bekele et al. | |

FOREIGN PATENT DOCUMENTS

| | | | |
|---|---|---|---|
| EP | 1 752 285 | | 2/2007 |
| EP | 1 810 821 A1 | | 7/2007 |
| EP | 1 810 822 A1 | | 7/2007 |
| EP | 1 873 738 | | 1/2008 |
| JP | 61-41543 | | 2/1986 |
| JP | 1993-005659 B | | 1/1993 |
| JP | 07-137212 | | 5/1995 |
| JP | 2002-012731 | * | 1/2002 |
| JP | 2002215044 A | | 7/2002 |
| JP | 2002-351332 | | 12/2002 |
| JP | 2004025458 A | | 1/2004 |
| JP | 2004181876 | | 7/2004 |
| JP | 2004250469 A | | 9/2004 |
| JP | 2005-119075 | | 5/2005 |
| JP | 2005-131824 | | 5/2005 |
| JP | 2005-313389 | | 11/2005 |
| JP | 2006-21353 | | 1/2006 |
| JP | 2006-159905 | | 6/2006 |
| JP | 3845410 | | 11/2006 |
| WO | WO 2005-102695 | | 11/2005 |
| WO | WO 2006-051628 | | 5/2006 |
| WO | WO 2006/051884 | | 5/2006 |
| WO | WO 2006-051920 | | 5/2006 |
| WO | WO 2006/114931 A1 | | 11/2006 |
| WO | WO 2007/058783 A1 | | 5/2007 |

OTHER PUBLICATIONS

Ticona website material, "Shrink Sleeves", http://www.ticona.com/ticona/index/markets/packaging/shrink_sleeves.htm (printed Aug. 3, 2005).

Ticona website material, "Topas Cyclic Olefin Copolymers (COC)", http://www.ticona.com/index/products/coc/topas.htm (printed Aug. 3, 2005).

N. Anyadike, "Stretching out: Flexible shrink sleeve labels provide stronger branding and tamper evidence," Brand vol. 2, No. 2, pp. 28-35 (Jan.-Feb. 2003).

Wiley Encyclopedia of Packaging Technology, 2nd ed., pp. 69-70 (John Wiley & Sons, Jan. 1997).

"Growth Shrinks . . . ," Flexible, vol. 2, No. 5, pp. 22-31 (Jan.-Feb. 2004).

BASF Corporation, Product Information Brochure, Styrolux 656C (Aug. 2005).

Eastman Corporation, Product Data Sheet, Eastar Copolyester 6763 (printed Aug. 3, 2005).

Eastman Corporation, "Application / Uses" Information Sheet, Eastar Copolyester 6763 (printed Aug. 3, 2005).

International Search Report and Written Opinion of the ISA mailed Jun. 25, 2008 for Int'l App. No. PCT/US2008/001923 (corresponds to U.S. Appl. No. 11/706,945).

Film Properties of Plastics and Elastomers-A Guide to Non-Wovens in Packaging Applications 2nd Edition, ed. Massey, L.K., Plastics Design Library, p. 125-127,2004.

* cited by examiner

SHRINK SLEEVE LABEL

BACKGROUND OF THE INVENTION

The present invention relates to a shrink film useful for manufacture of a shrink sleeve.

A shrink sleeve having a density less than the density of water may facilitate the use of float recycling methods to separate the shrink sleeve from a PET bottle labeled by the shrink sleeve. Although a film for such a shrink sleeve may comprise a blend of ethylene/norbornene copolymer with other polymers, such a blend may result in the film having an undesirably low Young's modulus for a shrink sleeve end use.

SUMMARY OF THE INVENTION

One or more embodiments of present invention may address one or more of the aforementioned problems. In one aspect of the invention, a film comprises a skin layer and a base layer. The skin layer comprises modified polyester selected from one or more of glycol-modified polyester and acid-modified polyester. The base layer comprises one or more polymers selected from alpha-olefin/cyclic-olefin copolymer and alpha-olefin/vinyl aromatic copolymer. The film has a free shrink at 100° C. in at least one direction of at least about 10%.

In another aspect of the invention, the film comprises a skin layer and a base layer. The skin layer comprises one or more polymers selected from polystyrene and modified polyester. The base layer comprises one or more polymers selected from alpha-olefin/cyclic-olefin copolymer and alpha-olefin/vinyl aromatic copolymer. The one or more polymers have a glass transition temperature of less than 50° C. The film has a free shrink at 100° C. in at least one direction of at least about 10%.

The invention will be more readily understood and appreciated by reference to the detailed description of the invention and the drawings.

DETAILED DESCRIPTION OF THE INVENTION

A film useful in shrink sleeve applications may comprise one or more of the following layers: a skin layer, a base layer, a bulk layer, and an intermediate layer. These layers are discussed below.

The film may have a total thickness of at least about, and/or at most about, any of the following: 1, 2, 3, 4, 5, 7, 9, 10, and 15 mils.

The film may comprise at least, and/or at most, any of the following numbers of layers: 2, 3, 4, 5, 6, 7, 8, 9, 10, 11, 13, and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application.

The film may have a density (at 23° C.) of at most about, and/or at least about, any of the following: 1.10, 1.05, 1.00, 0.98, 0.96, and 0.94 grams/cubic centimeter. The density of the film is measured according to ASTM D792. If the density of the label film is less than that of water, while the density of the bottle (e.g., a PET bottle) is greater than that of water, then it may be possible for recycle separation of the plastic of the bottle from the plastic of the label comprising the film by using a water float separation technique in which the label plastic floats and the bottle plastic sinks. On the other hand, if the density of the label film is greater than that of water, while the density of the bottle (e.g., a polyolefin bottle such as an HDPE bottle) is less than that of water, then it may be possible for recycle separation of the plastic of the bottle from the plastic of the label comprising the film by using a water float separation technique in which the label plastic sinks and the bottle plastic floats. The density of the film may be adjusted by varying the relative amounts of components, for example, by varying the amount of PETG in the film.

Below are some examples of combinations in which the alphabetical symbols designate the film layers. Where the multilayer film representation below includes the same letter more than once, each occurrence of the letter may represent the same composition or a different composition within the class that performs a similar function.

A/B, A/B/A, A/C/B, A/C/B/A, A/C/B/C/A, A/B/D, A/D/B, A/C/D/B, A/D/C/B, A/C/BID, A/C/D/C/B, A/D/B/C/A, A/C/BID/A, A/C/D/B, A/D/BID/A, A/C/D/B/C/A, A/C/D/BID/C/A, A/B/B/A, A/C/B/B/A, A/C/B/B/C/A, A/BID/B/A, A/C/BID/B/C/A, A/B/B

"A" represents a skin layer, as discussed below.
"B" represents a base layer, as discussed below.
"C" represents an intermediate layer (e.g., a tie layer), as discussed below.
"D" represents a bulk layer, as discussed below.

Skin Layer

The film may comprise at least one skin layer forming an outer surface of the film. A skin layer is an "outer layer" of the film, that is, a layer that has only one side directly adhered to another layer of the film. For multilayered films, there inherently exists two outer layers of the film. An "outside layer" is an outer layer of the film that is, or is intended to be, facing outwardly from a label or package comprising the film. An "inside layer" of a film is an outer layer of the film that is, or is intended to be, facing inwardly from a label comprising the film (i.e., toward the labeled item) or from a package comprising the film (i.e., toward the package interior space).

In addition to a first skin layer, the film may comprise a second skin layer as an outer layer of the film. The composition, thickness, and other characteristics of the first and second skin layers may be any of those described below with respect to the skin layer. Any of the composition, thickness, and other characteristics of the second skin layer may be substantially the same as any of those of the first skin layer, or may differ from any of those of the first skin layer.

The first and/or second skin layers may each have a thickness of at least about, and/or at most about, any of the following: 0.05, 0.1, 0.15, 0.2, 0.25, 0.5, 1, 2, 3, 4, and 5 mils. The thickness of a skin layer as a percentage of the total thickness of the film may be at least about, and/or at most about, any of the following: 1, 3, 5, 7, 10, 15, 20, 25, 30, 35, 40, 45, and 50 percent.

The first and/or second skin layers may each comprise one or more of any of the following polymers: polystyrene (e.g., styrene/butadiene copolymer) and modified polyester (e.g., glycol-modified polyester and acid-modified polyester). A skin layer may comprise one or more of any of the below described polystyrene and modified polyester polymers in at least about, and/or at most about, any of the following amounts: 40, 50, 60, 70, 80, 90, 95, and 100%, by weight of the layer.

Polystyrene

Exemplary polystyrene includes stryrene homo- and copolymers. The polystyrene may be substantially atactic, syndiotactic or isotactic. The term "polysytrene" includes copolymer that contains at least 50 mole % monomer units derived from styrene. Styrene may be copolymerized with alkyl acrylates, maleic anhydride, isoprene, or butadiene (i.e., the styrene may be styrene/butadiene copolymer). "Copolymer" as used in this application means a polymer derived from two or more types of monomers, and includes terpolymers, etc. Styrene copolymers with isoprene and butadiene may be further hydrogenated.

Exemplary polystyrene includes styrene/butadiene block copolymer available from BASF under the Styrolux 656C trade name and styrene/butadiene copolymer available from Amco Corporation under the Amaloy B1119 trade name believed to have a 75 mole % styrene content and a 25 mole % butadiene content). Useful styrene/butadiene copolymer may have a styrene content of at least about, and/or at most about, any of the following mole percentages: 65, 70, 75, 80, 85, 90, and 95%.

Modified Polyester

Exemplary modified polyester includes glycol-modified polyester and acid-modified polyester. Modified polyesters are made by polymerization with more than one type of comonomer in order to disrupt the crystallinity and thus render the resulting polyester more amorphous.

Polyester includes polymers made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (which includes their derivatives such as anhydrides or simple esters like methyl esters) include aromatic dicarboxylic acids and derivatives (e.g., terephthalic acid, isophthalic acid, dimethyl terephthalate, dimethyl isophthalate, naphthalene-2,6-dicarboxylic acid) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Representative dicarboxylic acids may be represented by the general formula:

HOOC—Z—COOH where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid ("I") and terephthalic acid ("T"). As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, bisphenol A, and cyclohexane dimethanol ("CHDM").

Exemplary hydroxycarboxylic acids and lactones include 4-hydroxybenzoic acid, 6-hydroxy-2-naphthoic acid, pivalolactone, and caprolactone.

Exemplary polyesters may be derived from lactone polymerization; these include, for example, polycaprolactone and polylactic acid.

A glycol-modified polyester is a polyester derived by the condensation of at least one polyfunctional carboxylic acid with at least two types of polyfunctional alcohols. For example, glycol-modified poly(ethylene terephthalate) or "PETG" may be made by condensing terephthalic acid with ethylene glycol and cyclohexane dimethanol ("CHDM"). A useful PETG is available from Eastman Corporation under the Eastar 6763 trade name, and is believed to have about 34 mole % CHDM monomer content, about 16 mole % ethylene glycol monomer content, and about 50 mole % terephthalic acid monomer content. Another useful glycol-modified polyester may be made similar to PETG, but substituting dimethyl terephthalate for the terephthalic acid component. Another exemplary glycol-modified polyester is available under the Ecdel 9965 trade name from Eastman Corporation, and is believed to have a density of 1.13 g/cc and a melting point of 195° C. and to be derived from dimethyl 1,4 cyclohexanedicarboxylate, 1,4 cyclohexane-dimethanol, and poly (tetramethylene ether glycol).

Exemplary acid-modified polyester may be made by condensation of at least one polyfunctional alcohol with at least two types of polyfunctional carboxylic acids. For example, at least one of the polyfunctional alcohols listed above may be condensed with two or more of the polyfunctional carboxylic acids listed above (e.g., isophthalate acid, adipic acid, and/or Naphthalene-2,6-dicarboxylic acid). An exemplary acid-modified polyester may be derived from about 5 mole % isophthalic acid, about 45 mole % terephthalic acid, and about 50 mole % ethylene glycol, such as that available from Invista Corporation.

The modified polyester may be selected from random polymerized modified polyester or block polymerized polyester.

The modified polyester may be derived from one or more of any of the constituents discussed above. If the modified polyester includes a mer unit derived from terephthalic acid, then such mer content (mole %) of the diacid of the polyester may be at least about any the following: 70, 75, 80, 85, 90, and 95%.

The modified polyester may be thermoplastic. The modified polyester may be substantially amorphous, or may be partially crystalline (semi-crystalline). The modified polyester and/or the skin layer may have a crystallinity of at least about, and/or at most about, any of the following weight percentages: 5, 10, 15, 20, 25, 30, 35, 40, and 50%.

The crystallinity may be determined indirectly by the thermal analysis method, which uses heat-of-fusion measurements made by differential scanning calorimetry ("DSC"). All references to crystallinity percentages of a polymer, a polymer mixture, a resin, a film, or a layer in this Application are by the DSC thermal analysis method, unless otherwise noted. The DSC thermal analysis method is believed to be the most widely used method for estimating polymer crystallinity, and thus appropriate procedures are known to those of skill in the art. See, for example, "Crystallinity Determination," Encyclopedia of Polymer Science and Engineering, Volume 4, pages 482-520 (John Wiley & Sons, 1986), of which pages 482-520 are incorporated herein by reference.

Under the DSC thermal analysis method, the weight fraction degree of crystallinity (i.e., the "crystallinity" or "Wc") is defined as $\Delta Hf/\Delta H°f,c$, where "$\Delta Hf$" is the measured heat of fusion for the sample (i.e., the area under the heat-flow versus temperature curve for the sample) and "$\Delta H°f,c$" is the theoretical heat of fusion of a 100% crystalline sample. The $\Delta H°f,c$ values for numerous polymers have been obtained by extrapolation methods; see for example, Table 1, page 487 of the "Crystallinity Determination" reference cited above. The $\Delta H°f,c$ for polymers are known to, or obtainable by, those of skill in the art. The $\Delta H°f,c$ for a sample polymer material may be based on a known $\Delta H°f,c$ for the same or similar class of polymer material, as is known to those of skill in the art. For example, the $\Delta H°f,c$ for polyethylene may be used in calculating the crystallinity of an EVA material, since it is believed that it is the polyethylene backbone of EVA rather than the vinyl acetate pendant portions of EVA, that forms crystals. Also by way of example, for a sample containing a blend of polymer materials, the $\Delta H°f,c$ for the blend may be estimated using a weighted average of the appropriate $\Delta H°f,c$ for each of the polymer materials of separate classes in the blend.

The DSC measurements may be made using a thermal gradient for the DSC of 10° C./minute. The sample size for the DSC may be from 5 to 20 mg.

Base Layer

The base layer may be an outer layer of the film; or the base layer may be an inner layer of the film. An "inner" layer is a layer that has both sides directly adhered to other layers of the film.

The base layer may have a thickness of at least about, and/or at most about, any of the following: 0.05, 0.1, 0.15, 0.2, 0.25, 0.5, 1, 2, 3, 4, 5, 8, 10, and 15 mils. The thickness of the base layer as a percentage of the total thickness of the film may be at least about, and/or at most about, any of the following: 10, 15, 20, 25, 30, 35, 40, 45, 50, 60, 70, and 80 percent.

The base layer may comprise alpha-olefin/cyclic-olefin copolymer ("COC"). COC is a copolymer that may be formed by polymerization of cyclic-olefin and alpha-olefin. A cyclic olefin is a compound containing a polymerizable carbon-carbon double bond that is either within an alicyclic ring (e.g., as in norbornene) or is linked to an alicyclic ring (e.g., as in vinyl cyclohexane). The COC may have a cyclic ring as part of the polymer backbone (e.g., ethylene/cyclopentene copolymer and ethylene/norbornene copolymer). The COC may have a cyclic ring pendant to the polymer backbone (e.g., ethylene/vinyl cyclohexane copolymer).

Exemplary COC may comprise (polymerized) cyclic-olefin content derived from one or more of cyclopentene, substituted cyclopentene, norbornene, substituted norbornene, cyclobutene, cyclopentene, methylcyclopentene, 5-vinylnorbornene, 5-methylnorbornene, 5-ethylidenorbornene, dicyclopentadiene, tetracyclododecene, and cyclododecatriene.

Useful COC may comprise cyclic-olefin content, such as any of those cyclic olefins-identified above, in at least about, and/or at most about, any of the following mole %: 10, 15, 18, 20, 22, 24, 28, 30, 32, 35, 40, and 45.

Useful alpha-olefin of the COC may be linear or branched, and may have, for example, at least and/or at most any of the following number of carbon atoms: 2, 3, 4, 6, 8, 10, 14, 18, and 20. For example, the COC may comprise alpha-olefin content derived from one or more of ethylene and propylene. Useful COC may comprise alpha-olefin content (e.g., any of one or more the above described alpha-olefins) in at least about, and/or at most about, any of the following mole %: 90, 85, 80, 75, 70, 65, 60, and 55.

Exemplary COC includes ethylene/cyclic-olefin copolymer and propylene/cyclic-olefin copolymer. Useful COC includes ethylene/norbornene copolymer, ethylene/norbornene/octene copolymer, ethylene/norborne/butene copolymer, ethylene/norbornene/hexene copolymer, and propylene/norbornene copolymer.

The alpha-olefin/cyclic-olefin copolymer may be homogeneous or may be heterogeneous. The homogeneous and heterogeneous aspects of polymers are discussed below in more detail in conjunction with ethylene/alpha-olefin copolymers.

The base layer may comprise alpha-olefin/vinyl aromatic copolymer ("AO/VA"), which is a copolymer of alpha-olefin and vinyl aromatic monomers. The alpha-olefin of the AO/VA may be one or more of any of those discussed above with respect to COC. The vinyl aromatic compound of the AO/VA may be one or more of any of styrene, methyl-styrene (e.g., p-methyl styrene), vinyl toluene, vinyl xylene, vinyl naphthalene, and vinyl anthracene. Exemplary AO/NA includes ethylene/styrene copolymer and ethylene/vinyl toluene copolymer.

The AO/VA may be heterogeneous or homogeneous. The AO/VA may be a random polymer or a block polymer. The AO/VA may comprise vinyl aromatic content (e.g., any of one or more the above described vinyl aromatic compounds) in at least about, and/or at most about, any of the following weight %: 90, 85, 80, 75, 70, 65, 60, and 55. The AO/VA may comprise alpha-olefin content in at least about, and/or at most about, any of the following weight %: 5, 10, 15, 20, 25, 30, 35, 40, and 45.

Useful COC and/or AO/VA may each independently have a glass transition temperature ("Tg") of at least about, and/or at most about, any of the following: 25, 30, 35, 40, 45, 50, 55, and 60° C.

Unless specified otherwise, the Tg is measured at a relative humidity of 0%. All references to the glass transition temperature of a polymer, a polymer mixture, a resin, a film, or a layer in this Application refer to the characteristic temperature at which amorphous polymers, or the amorphous part of semi-crystalline polymers, of the sample changes from a hard, glassy, or brittle state to a soft, flexible, rubbery state, as measured by dynamic mechanical analysis ("DMA") according to ASTM D4065 and ASTM D5026, using a dynamic displacement frequency of 22 radians/second, an amplitude of displacement of 0.1% strain, a thermal gradient of 3° C./minute, and a nitrogen atmosphere, where the temperature is ramped from −150° C. up to the point of loss of transducer sensitivity (i.e., when the film falls apart). The Tg is the tan delta beta transition peak temperature averaged for two samples.

The base layer may comprise COC (e.g., any of the above-identified COC) and/or may comprise AO/VA (e.g., any of the above-identified AO/VA) in at least about, and/or at most about, any of the following amounts, based on the weight of the base layer: 5, 10, 15, 20, 25, 30, 35, 40, 45, 50, 55, 60, 75, 80, 85, 90, 95, 98, and 100 weight %. For example, the base layer may comprise at least about 20 weight % of ethylene/norbornene copolymer having a Tg of less than about 40° C.; and/or, for example, the base layer may comprise at least about 25 weight % ethylene/styrene copolymer having a Tg of less than about 60° C.

The base layer may comprise a first COC selected from any of the COCs described above, and a second COC (different from the first COC), selected from any of the COCs described above. The base layer may comprise the first COC in at least about, and/or at most about, any of the following amounts, based on the weight of the base layer: 5, 10, 15, 20, 25, 30, 35, 40, 45, 50, 55, 60, 75, 80, 85, 90, and 95 weight %. The base layer may comprise the second COC in at least about, and/or at most about, any of the following amounts, based on the weight of the base layer: 5, 10, 15, 20, 25, 30, 35, 40, 45, 50, 55, 60, 75, 80, 85, 90, and 95 weight %. For example, the base layer may comprise at least about 15 weight % of a first ethylene/norbornene copolymer having a Tg of less than about 30° C., and at most about 20 weight % of a second COC having a Tg of at least about 60° C.

The base layer may comprise a first AO/VA selected from any of the AO/VAs described above, and a second AO/VA (different from the first AO/VA), selected from any of the AO/VAs described above. The base layer may comprise the first AO/VA in at least about, and/or at most about, any of the following amounts, based on the weight of the base layer: 5, 10, 15, 20, 25, 30, 35, 40, 45, 50, 55, 60, 75, 80, 85, 90, and 95 weight %. The base layer may comprise the second AO/VA in at least about, and/or at most about, any of the following amounts, based on the weight of the base layer: 5, 10, 15, 20, 25, 30, 35, 40, 45, 50, 55, 60, 75, 80, 85, 90, and 95 weight %. For example, the base layer may comprise at least about 15 weight % of a first ethylene/styrene copolymer having a Tg of less than about 30° C., and at most about 20 weight % of a second AO/VA having a Tg of at least about 60° C.

Exemplary homogeneous COC includes ethylene/norbornene copolymer available from Ticona Corporation under the Topas trademark, for example, Topas 9506×1 (believed to have a Tg of about 26° C.), Topas 9506 (believed to have a Tg of about 65° C.), Topas 8007 (believed to have a Tg of about 85° C.), Topas 6017 (believed to have a Tg of about 180° C.), Topas 6015 (believed to have a Tg of about 160° C.), Topas 6013 (believed to have a Tg of about 140° C.), and Topas 5013 (believed to have a Tg of about 135° C.), and ethylene/norbornene copolymer available from Mitusi Corporation under the APEL trade name.

The base layer may further comprise one or more polyethylenes, such as ethylene homopolymer and/or ethylene copolymers, and/or one or more polypropylene copolymers, such as one or more propylene/ethylene copolymers ("PEC"). Ethylene copolymers have ethylene (i.e., ethylene mer) as the majority mole percentage content. Propylene copolymers have propylene (i.e., propylene mer) as the majority mole percentage content. Exemplary polypropylenes include propylene/ethylene copolymer. Useful PEC may have an ethylene monomer content of at least about, and/or at most about, any of the following: 1, 1.5, 2, 3, 4, 5, 6, 8, 10, 12, 13.5, and 15 weight percent, based on the weight of the copolymer.

Ethylene homopolymers include high density polyethylene ("HDPE") and low density polyethylene ("LDPE"). Ethylene copolymers include ethylene/alpha-olefin copolymer ("EAO") and ethylene/unsaturated ester copolymer.

EAOs are copolymers of ethylene and one or more alpha-olefins, the copolymer having ethylene content as the majority mole-percentage content. The comonomer alpha-olefin may be selected from one or more of any of the $C_3$-$C_{20}$ α-olefins, such as the $C_4$-$C_{12}$ α-olefins, the $C_4$-$C_8$ α-olefins, 1-butene, 1-hexene, and 1-octene.

EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs.

Ethylene/unsaturated ester copolymer is a copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth)acrylate) comonomer content of the ethylene/unsaturated ester copolymer may be at least about 3, 6, and 8 wt. % and/or may be at most about 12, 18, and 40 wt. %, based on the weight of the copolymer. Useful ethylene contents of the ethylene/unsaturated ester copolymer include at least about, and/or at most about, any of the following: 60 wt. %, 82 weight %, 85 weight %, 88 weight %, 92 wt. %, 93 wt. %, 94 weight %, and 97 wt. %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer includes ethylene/(meth)acrylic acid copolymer, which is the copolymer of ethylene and acrylic acid, methacrylic acid, or both.

Useful polyethylene, polypropylene, and/or ethylene/unsaturated ester copolymer includes those having a density of at least about, and/or at most about, any of the following: 0.94, 0.93, 0.925, 0.922, 0.920, 0.917, 0.915, 0.912, 0.910, 0.907, 0.905, 0.903, 0.900, 0.898, and 0.890 grams/cubic centimeter. Unless otherwise indicated, all densities herein are measured according to ASTM D1505.

Any of the ethylene/alpha-olefin, the COC, the AO/VA, and/or the PEC may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions.

Examples of homogeneous polymers include the metallocene-catalyzed linear homogeneous ethylene/alpha-olefin copolymer resins available from the ExxonMobil Corporation (Baytown, Tex.) under the EXACT trademark (e.g., EXACT 3024 ethylene/butene copolymer and EXACT 8201 ethylene/octene copolymer believed to have a density of 0.882 g/cc) and EXCEED trademark (e.g., EXCEED 4518 PA ethylene/hexene copolymer), linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark, such as Dow Affinity PF1140G and Dow Affinity EG 8100.

An example of a heterogeneous MDPE is available from Dow Corporation under the Dowlex 2037 trademark, and is believed to have an octene monomer content of 2.5 mole % and a density of 0.9350 g/cc.

The polyethylene may have a density of at least about, and/or at most about, any of the following values: 0.96, 0.95, 0.94, 0.93, 0.92, 0.91, 0.90, 0.89, and 0.87 grams/cubic centimeter. Unless otherwise indicated, all densities in this Application are measured according to ASTM D1505.

The base layer may comprise at least about, and/or at most about, any one or more of the above-described polyethylenes or polypropylenes or ethylene/unsaturated ester copolymer in any of the following amounts: 30, 40, 45, 50, 55, 60, 65, 70, 75, 80, 85, 90, and 95% by weight of the layer.

The film may include recycled film material in any of the layers (e.g., in the base layer). For example, the film may include recycled film material in at least about, and/or at most about, any of the following amounts: 5, 10, 15, 20, 25, and 30% by weight of the layer comprising the recycled film material.

Intermediate Layer

The film may comprise at least one intermediate layer. In addition to a first intermediate layer, the film may comprise a second intermediate layer. The composition, thickness, and other characteristics of the first and second intermediate layers may be any of those described below with respect to the intermediate layer. Any of the composition, thickness, and other characteristics of the second intermediate layer may be substantially the same as any of those of the first intermediate layer, or may differ from any of those of the first intermediate layer.

An intermediate layer may be, for example, between the skin layer and the base layer. An intermediate layer may be directly adjacent the skin layer, so that there is no intervening layer between the intermediate and skin layers. An intermediate layer may be directly adjacent the base layer, so that there is no intervening layer between the intermediate and base layers.

An intermediate layer may have a thickness of at least about, and/or at most about, any of the following: 0.05, 0.1, 0.15, 0.2, 0.25, 0.5, 1, 2, 3, 4, and 5 mils. The thickness of the intermediate layer as a percentage of the total thickness of the film may be at least about, and/or at most about, any of the following: 1, 3, 5, 7, 10, 15, 20, 25, 30, 35, 40, 45, and 50 percent.

An intermediate layer may comprise one or more of the polyethylenes described above in the Base Layer section in at least about, and/or at most about, any of the following amounts: 10, 20, 25, 30, 40, 45, 50, 55, 60, 65, 70, 75, 80, 85, 90, 95, and 100% by weight of the layer.

An intermediate layer may comprise one or more of any of the tie polymers discussed below in at least about, and/or at most about, any of the following amounts: 10, 20, 30, 40, 50, 60, 70, 75, 80, 90, 95, and 100%, based on the weight of the layer.

Useful tie polymers include thermoplastic polymers that may be compatible both with the polymer of one directly adjacent layer and the polymer of the other directly adhered layer. Such dual compatibility enhances the adhesion of the tied layers to each other.

Exemplary tie polymers include:

1. Ethylene/vinyl acetate copolymer (EVA), for example, having a vinyl acetate content of at least about, and/or at most about, any of the following weight % amounts: 3%, 5%, 10%, 15%, 20%, 22%, 24%, 25%, 28%, and 30%. EVA also includes, for example, ethylene/vinyl acetate/carbon monoxide terpolymer, for example, having carbon monoxide content of at least about, and/or at most about, any of the following weight % amounts: 0.1%, 0.5%, 1%, 1.5%, 2%, 3%, 4%, and 5%, all based on the weight of the polymer.

2. Ethylene/(meth)acrylic acid copolymers (e.g., ethylene/acrylic acid polymer, ethylene/methacrylic acid copolymer), such as any of those described elsewhere in this Application, for example, an ethylene/acrylic acid available from Dow Corporation under the PRIMACOR 1410 trademark and an ethylene/methylacrylate/acrylic acid terpolymer available from ExxonMobil under the Escor 310 and Escor 320 trademarks;

3. Ethylene/$C_1$-$C_{12}$ alkyl (meth)acrylate copolymers (e.g., ethylene/methyl acrylate copolymer, ethylene/butyl acrylate copolymer, ethylene/methyl methacrylate copolymer), such as any of those described elsewhere in this Application, for example, ethylene/methyl acrylate copolymer having a methyl acrylate content of at least about, and/or at most about, any of the following: 5, 10, 15, and 20 weight % (e.g., the resin available from the Eastman Chemical Company under the EMAC+SP1305 trademark), also for example, where the copolymer is a block copolymer comprising at least about 20 weight % (meth)acrylate monomer; and 4. Polymers modified (e.g., grafted) with unsaturated carboxylic acid anhydride (i.e., anhydride-modified polymer) to incorporate anhydride functionality, which promotes or enhances the adhesion characteristics of the polymer. Examples of unsaturated carboxylic acid anhydrides include maleic anhydride, fumaric anhydride, and unsaturated fused ring carboxylic acid anhydrides. Examples of anhydride-modified polymers include the anhydride-modified version of any of the polymers listed above in numbers 1-3 as well as any of the other polyolefins (e.g., ethylene homopolymer, ethylene/alpha-olefin copolymer, ethylene/unsaturated ester copolymer, ethylene/(meth)acrylic acid copolymer, propylene homopolymer, and propylene copolymer) described in this Application, thus including anhydride-modified ethylene homo- and co-polymers and propylene homo- and co-polymers.

Examples of anhydride-modified tie polymers also include: a) maleic anhydride-grafted linear low density polyethylene available from Rhom and Haas under the TYMOR 1228B trademark and from Equistar Division of Lyondell Corporation under the PX3236 trade name, b) maleic anhydride-grafted ethylene/vinyl acetate copolymer available under the FUSABOND MC250D trade name (28% vinyl acetate content) and from Dupont Corporation under the BYNEL trademark, such as Bynel 3861 (25% vinyl acetate content), c) maleic anhydride-grafted polypropylene available from Mitsui Petrochemical Corp (Tokyo, Japan) under the ADMER QB 510A trade name, d) PLEXAR 360 RESIN (Quantum Co.; Cincinnati, Ohio), e) the LOTADER series of ethylene/alkyl acrylate/maleic anhydride interpolymers (Elf-Atochem, Inc.; Buffalo, N.Y.), f) maleic anhydride-grafted ethylene/butene copolymer available from Dow Corporation under the Amplify GF209 trade mark, g) maleic anhydride-grafted ethylene/methyl acrylate copolymer available from Dupont Corporation under the BYNEL 21E810 trade name, and h) ethylene/vinyl acetate/maleic anhydride terpolymer available under the OREVAC 9314 trade name (14% vinyl acetate and 1% maleic anhydride). The anhydride-modified polymer may be made by grafting or copolymerization.

Useful anhydride-modified polymers may contain anhydride moiety in an amount (based on the weight of the modified polymer) of at least about, and/or at most about, any of the following: 0.1%, 0.5%, 1%, 2%, 4%, 5%, 8%, and 10%.

Bulk Layer

The film may comprise at least one bulk layer. A bulk layer may be, for example, between the skin layer and the base layer. A bulk layer may be directly adjacent the base layer, so that there is no intervening layer between the intermediate and base layers. A bulk layer may be an outer layer of the film.

A bulk layer may have a thickness of at least about, and/or at most about, any of the following: 0.05, 0.1, 0.15, 0.2, 0.25, 0.5, 1, 2, 3, 4, and 5 mils. The thickness of the bulk layer as a percentage of the total thickness of the film may be at least about, and/or at most about, any of the following: 1, 3, 5, 7, 10, 15, 20, 25, 30, 35, 40, 45, and 50 percent.

A bulk layer may comprise one or more of the polyethylenes described above in the Base Layer section in at least about, and/or at most about, any of the following amounts: 10, 20, 30, 40, 45, 50, 55, 60, 65, 70, 75, 80, 85, 90, 95, and 100% by weight of the layer.

Additives

One or more layers of the film may include one or more additives useful in thermoplastic films, such as, antiblocking agents, slip agents, antifog agents, colorants, pigments, dyes, flavorants, antimicrobial agents, meat preservatives, antioxidants, fillers, radiation stabilizers, and antistatic agents.

Modulus of the Film

The film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. The film may have a Young's modulus of at least about, and/or at most about, any of the following: 60,000; 100,000; 130,000; 150,000; 200,000; 250,000; 300,000; and 350,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

Appearance Characteristics of the Film

The film may have low haze characteristics. Haze is a measurement of the transmitted light scattered more than 2.5° from the axis of the incident light. Unless otherwise noted, haze is measured against the outside layer of the film. The "outside layer" is the outer layer of the film that is or is intended to be adjacent the space outside of a package comprising the film. (The "inside layer" of a film is the outer layer of the film that is or is intended to be adjacent the space inside of a package comprising the film.) Haze is measured according to the method of ASTM D 1003, which is incorporated herein in its entirety by reference. All references to a "haze" value for a film in this application are by this standard. The haze of the film—measured at a time selected from before the forming step or after the forming step—may be at most about any of the following values: 30%, 25%, 20%, 15%, 10%, 8%, 5%, 3, and 2%.

The film may have a gloss (i.e., specular gloss) as measured against the outside layer—measured at a time selected from before the forming step or after the forming step—of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film—measured at a time selected from before the forming step or after the forming step—may be at least about any of the following values: 65%, 70%, 75%, 80%, 85%, and 90%, measured in accordance with ASTM D1746. All references to "regular transmittance" values in this application are by this standard.

The total luminous transmittance (i.e., total transmittance) of the film—measured at a time selected from before the forming step or after the forming step—may be at least about any of the following values: 65%, 70%, 75%, 80%, 85%, and 90%, measured in accordance with ASTM D1003. All references to "total luminous transmittance" values in this application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Manufacture of the Film

The film may be manufactured by thermoplastic film-forming processes known in the art. The film may be prepared by extrusion or coextrusion utilizing, for example, a tubular trapped bubble film process, a flat or tube cast film process, or a slit die flat cast film process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) and for example at a temperature below the film's melting point. The film may then be quickly cooled to retain the physical properties generated during orientation and to provide a heat-shrink characteristic to the film. The film may be oriented using, for example, a tenter-frame process or a bubble process. The orientation may occur in any of one direction (i.e., the machine or transverse direction) and/or two directions (e.g., the machine and transverse directions) by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1. The film may be stretched by any of these amounts in one direction and another of any of these amounts in another direction.

The film may have a free shrink at 100° C. in one direction (e.g., the machine direction or the transverse direction) and/or in both the machine and transverse directions of at least about, and/or at most about, any of the following: 5%, 7%, 9%, 10%, 12%, 15%, 25%, 30%, 40%, 45%, 50%, 55%, 60%, 70%, 75%, and 80%. The film may have any of the forgoing shrink amounts in the machine and/or transverse directions at any of the following temperatures: 90, 80, 70, 60, 50, and 40° C. For example, the film may have a free shrink at 80° C. in the transverse direction of at least about 60% and a free shrink at 60° C. in the machine direction of at most about 10%. Also, the film may have any combination of the forgoing shrink values at differing temperatures; for example, the film may have a free shrink at 90° C. in at least one direction of at least about 75% and a free shrink at 70° C. in any direction of at most about 5%. The film may be annealed, for example, to decrease the shrink attribute at a selected temperature (e.g., 70° C.).

The film may be annealed or heat-set to slightly or substantially reduce the free shrink of an oriented film, for example to raise the shrink initiation temperature. The film may have less than about any of 3%, 2%, and 1% free shrink in any direction at any of the following temperatures: 65, 60, 55, 50, 45, and 40° C.

The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

The film may have a printed image applied to it, for example, by any suitable ink printing method, such as rotary screen, gravure, or flexographic techniques. The printed image may be applied to a skin layer. The printed image may be applied as a reverse printed image, for example, applied to the inside layer of the film of a shrink sleeve.

Shrink Sleeve

Figure 1:
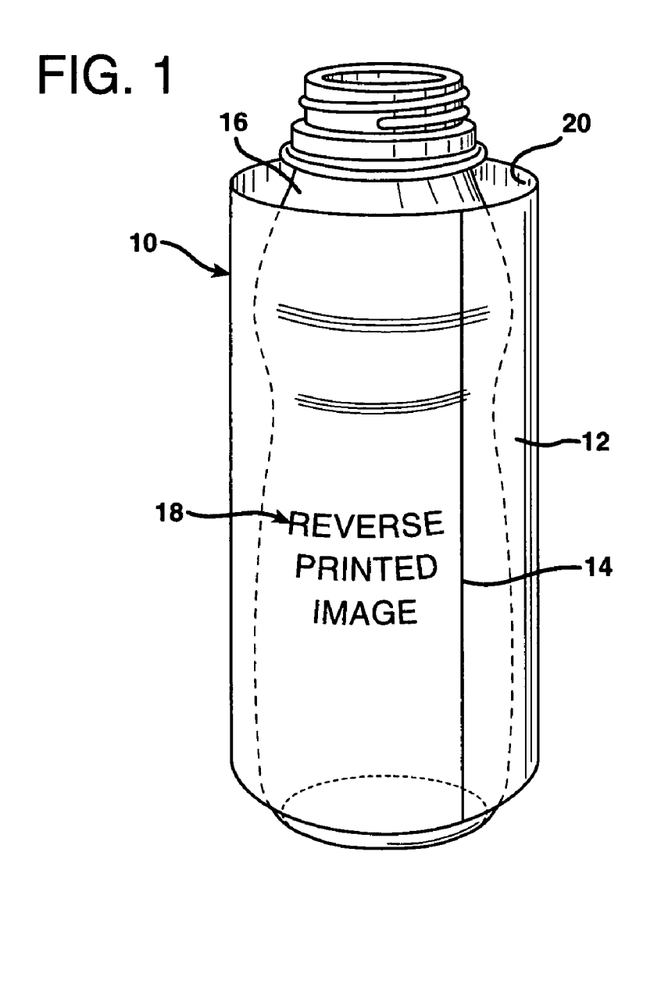
FIG. 1 is a representative perspective view of a shrink sleeve comprising an embodiment of the film of the present invention surrounding a container.
Figure 2:
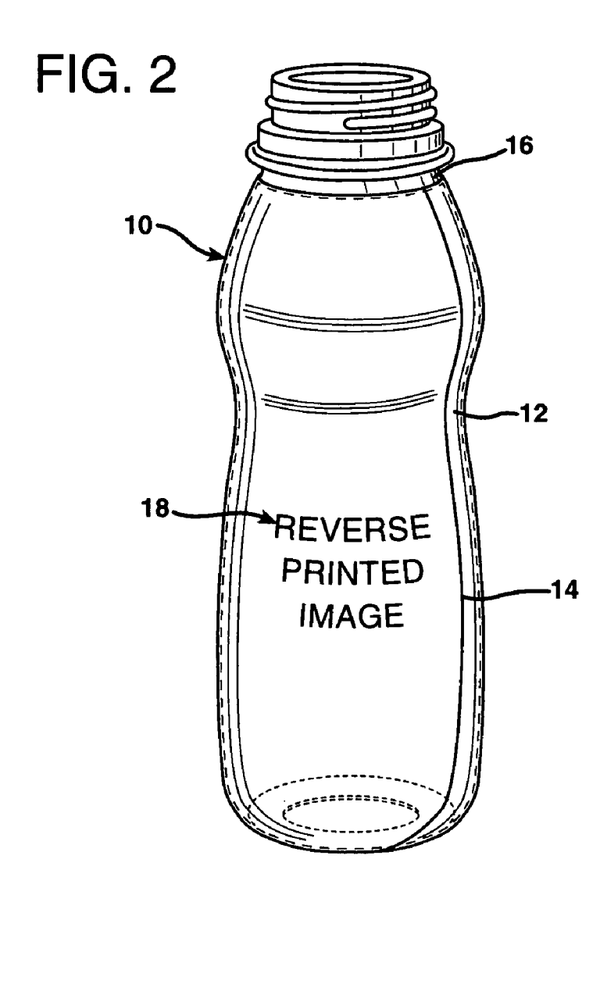
FIG. 2 is a representative perspective view of the shrink sleeve of FIG. 1 shrunk about the container to provide a shrink labeled container.

A shrink sleeve 10 (also known as a shrink sleeve label or a shrink band) may comprise the film 12. (FIGS. 1-2.) The shrink sleeve 10 may be a seamed shrink sleeve (illustrated in FIG. 1), a seamless shrink sleeve, or a roll-fed shrink sleeve (i.e., formed by roll-fed shrink film for wraparound labeling).

A seamed shrink sleeve that comprises the film may be manufactured from a flat configuration of the film, which is seamed into a tube by attaching the film to itself to form a tube having a seam 14 using, for example, an adhesive seam. If the sleeve 10 is to be printed, then the formation of the film into a tube may occur after images have been printed onto the film. The printed image 18 may be applied as a reverse printed image to the inside surface 20. The tube may then be wound onto a core. The roll of tubing may then be unwound from the core and cut to individual lengths to form the individual seamed shrink sleeves. The shrink sleeve may then be placed to surround the item (e.g., container 16) to which the shrink sleeve is to be applied. Heat may then be applied (e.g., by placing the shrink-sleeved item into a heat tunnel using, for example, steam or hot air) so that the heat shrink characteristic of the shrink sleeve is activated and the shrink sleeve shrinks to conform to the shape of the item that the shrink sleeve surrounds, as illustrated in FIG. 2.

A seamless shrink sleeve that comprises the film may be manufactured by extruding the film in a tube configuration having a desired tube configuration. The resulting tube may be printed and cut to desired lengths to form individual shrink sleeves.

A roll-fed shrink sleeve comprising the film may be manufactured by: 1) applying a pick-up adhesive to the leading edge of the film that has been cut into the desired dimensions, 2) adhering the leading edge to a container, 3) moving the container and the film relative each other so that the film surrounds the container, 4) applying an adhesive to the trailing edge of the film, 5) adhering the trailing edge of the film to the container or to the leading edge area of the film, and 6) exposing the shrink sleeve/container to heat to activate the shrink characteristic of the film.

A shrink sleeve comprising the film may be used, for example: 1) as a label applied to an item, 2) as a tamper-evident seal or packaging material (e.g., a tamper-evident neck band), and/or 3) to unitize two or more items (e.g., multi-packing). The shrink sleeve may be a full-body sleeve for enclosing a container. The shrink sleeve may be used to enclose a shaped and/or contoured container (e.g., an asymmetrically-shaped container).

The following examples are presented for the purpose of further illustrating and explaining the present invention and are not to be taken as limiting in any regard. Unless otherwise indicated, all parts and percentages are by weight.

In the examples below, these abbreviations have the following meanings:

PETG1 is a glycol-modified poly(ethylene terephthalate) available from Eastman Corporation under the Eastar 6763 trade name, and is believed to have about 34 mole % cyclohexane dimethanol monomer content, about 16 mole % ethylene glycol monomer content, and about 50 mole % terephthalic acid monomer content.

LLDPE1 is a heterogeneous linear low density polyethylene available from Dow Corporation under the Dowlex 2045 trade name, and is believed to have an octene comonomer content of about 6.5 mole % and a density of about 0.92 g/cc.

VLDPE1 is a homogeneous very low density polyethylene copolymer resin available from the Dow Chemical Company under the Affinity PF 1140G trademark, believed to have an octene monomer content of about 14 mole % and a density of 0.8965 g/cc.

COC1 is a homogeneous ethylene/norbornene copolymer purchased from Ticona Corporation under the Topas 9506 trade name, and is believed to have a norbornene monomer content of about 33 mole % and a glass transition temperature of about 65° C.

COC2 is a homogeneous ethylene/norbornene copolymer purchased from Ticona Corporation under the Topas 9506×1 trade name, and is believed to have a glass transition temperature of about 26° C.

Tie1 is a maleic anhydride-modified linear low density polyethylene (i.e., ethylene/butene copolymer) available from Dow Corporation under the Amplify GR 209 trade name.

AB1 is an antiblock masterbatch available from Eastman Chemical under the EPETG Antiblock 21219 MB001 AB trade designation.

Example 1

A three-layer film was made by extruding a film having an A/B/A film layer configuration where the "A" skin layers were PETG1 and the "B" base layer was a blend of 50 wt. % LLDPE1, 25 wt. % COC1, and 25 wt. % COC2. After orientation, the film was quenched to lock in the orientation. The thickness ratio of the layers was 1:8:1. The shrink initiation temperature for the film was about 40° C. The Young's modulus of the shrink film was about 285,000 psi. Table 1 below shows the percent free shrink in the transverse direction (TD) and machine direction (MD) at various temperatures.

Example 2

A film was made by extruding a film having an A/C/B/C/A film configuration. The "A" skin layers were 99 wt. % PETG1 and 1 wt. % AB1. The "B" base layer was 80 wt. % VLDPE1 and 20 wt. % COC2. The "C" intermediate layers were 50 wt. % VLDPE1 and 50 wt. % Tie1. The extruded film was oriented in the transverse direction in a ratio of about 6:1 at a temperature of about 205° C. After orientation, the film was quenched to lock in the orientation. The resulting film had a thickness of 1.75 mils. The layer thicknesses as a percentage of the total film thickness were 8%/8%/68%/8%/8%. The density of the film was 0.96 g/cc. The Young's modulus of the film was about 155,000 psi. Table 1 below shows the percent free shrink in the transverse direction (TD) at various temperatures.

Example 3

A three-layer film was made by extruding a film having an A/B/A film layer configuration where the "A" skin layers were PETG1 and the "B" base layer was a blend of 80 wt. % VLDPE1 and 20 wt. % COC1. After orientation, the film was quenched to lock in the orientation. The thickness ratio of the layers was 1:8:1. Table 1 below shows the percent free shrink in the transverse direction (TD) and machine direction (MD) at various temperatures.

TABLE 1

| Temperature (° C.) | Example 1 % Free Shrink (TD) | Example 1 % Free Shrink (MD) | Example 2 % Free Shrink (TD) | Example 3 % Free Shrink (TD) | Example 3 % Free Shrink (MD) |
|---|---|---|---|---|---|
| 35 | 0 | 0 | | | |
| 40 | 1 | 1 | | | |
| 45 | 4 | 4 | | 0 | 0 |
| 50 | 9 | 9 | | 0 | 0 |
| 55 | 26 | 26 | | 0 | 1 |
| 60 | 50 | 46 | 0 | 5 | 16 |
| 65 | 60 | 56 | | 28 | 40 |
| 70 | 66 | 62 | | 58 | 62 |
| 71.1 | | | 4 | | |
| 75 | | | | 67 | 70 |
| 82.2 | | | 30 | | |
| 93.3 | | | 63 | | |
| 104.4 | | | 79 | | |
| 115.6 | | | 81 | | |

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM-test identified, as of the priority filing date of this application. Each such published ASTM test method is incorporated herein in its entirety by this reference.

What is claimed is:

1. A film comprising:
   a skin layer comprising modified polyester selected from one or more of glycol-modified polyester and acid-modified polyester; and
   a base layer comprising:
      at least about 5% by weight of the base layer of one or more polymers selected from alpha-olefin/cyclic-olefin copolymer and alpha-olefin/vinyl aromatic copolymer, wherein the one or more polymers of the base layer have a glass transition temperature of less than 50° C.; and
      at least about 50% by weight of the base layer of additional polymer selected from one or more of ethylene homopolymer, ethylene/alpha-olefin copolymer, polypropylene copolymer, and ethylene/unsaturated ester copolymer;
   wherein the film has a free shrink at 100° C. in at least one direction of at least about 10%.

2. The film of claim 1 wherein the base layer comprises alpha-olefin/cyclic-olefin copolymer.

3. The film of claim 1 wherein the skin layer comprises glycol-modified polyester.

4. The film of claim 1 wherein the one or more polymers of the base layer have a glass transition temperature of less than about 40° C.

5. The film of claim 1 wherein the base layer comprises at most about 40% by weight of the base layer of the one or more polymers.

6. The film of claim 1 wherein the base layer comprises ethylene/norbornene copolymer.

7. The film of claim 1 further comprising a third layer comprising one or more tie polymers selected from ethylene/vinyl acetate copolymer, ethylene/(meth)acrylic acid copolymer, ethylene/$C_1$-$C_{12}$ alkyl (meth)acrylate copolymer, and polymers modified with unsaturated carboxylic acid anhydride.

8. The film of claim 7 wherein the third layer is between the skin and base layers.

9. The film of claim 1 wherein the total density of the film is less than about 1 g/cc.

10. The film of claim 1 wherein the Young's modulus of the film is at least about 150,000 psi.

11. The film of claim 1 wherein the Young's modulus of the modified polyester of the skin layer is at least about 150,000 psi.

12. The film of claim 1 wherein the free shrink in at least one direction is at least about 30%.

13. The film of claim 1 wherein the base layer comprises alpha-olefin/cyclic-olefin copolymer formed by polymerization utilizing a carbon-carbon double bond that is within the alicyclic ring of a cyclic olefin monomer to produce a cyclic ring as part of the alpha-olefin/cyclic-olefin copolymer backbone.

14. A shrink sleeve comprising the film of claim 1.

15. A method of labeling a container comprising:
placing the shrink sleeve of claim 14 around the container; and
shrinking the shrink sleeve to conform the shrink sleeve to the container.

16. The film of claim 1 wherein the one or more polymers of the base layer have a glass transition temperature of at most about 45° C.

17. A film comprising:
a skin layer comprising modified polyester selected from one or more of glycol-modified polyester and acid-modified polyester; and
a base layer comprising one or more polymers selected from alpha-olefin/cyclic-olefin copolymer and alpha-olefin/vinyl aromatic copolymer, wherein the base layer comprises a first alpha-olefin/cyclic-olefin copolymer having a glass transition temperature of at most about 55° C. and a second alpha-olefin/cyclic-olefin copolymer having a glass transition temperature of at least about 60° C. wherein:
the film has a free shrink at 100° C. in at least one direction of at least about 10%.

18. A film comprising:
a skin layer comprising one or more polymers selected from polystyrene and modified polyester; and
a base layer comprising:
at least about 5% by weight of the base layer of one or more polymers selected from alpha-olefin/cyclic-olefin copolymer and alpha-olefin/vinyl aromatic copolymer, wherein the one or more polymers of the base layer have a glass transition temperature of at most about 45° C.; and
at least about 50% by weight of the base layer of additional polymer selected from one or more of ethylene homopolymer, ethylene/alpha-olefin copolymer, polypropylene copolymer, and ethylene/unsaturated ester copolymer;
wherein the film has a free shrink at 100° C. in at least one direction of at least about 10%.

19. The film of claim 18 wherein the skin layer comprises modified polyester.

20. The film of claim 19 wherein the modified polyester comprises glycol-modified polyester.

21. The film of claim 20 wherein the glycol-modified polyester comprises glycol-modified poly(ethylene terephthalate).

22. The film of claim 18 wherein the one or more polymers of the base layer have a glass transition temperature of less than about 40° C.

23. The film of claim 18 wherein the base layer comprises at least about 10% by weight of the base layer of alpha-olefin/cyclic-olefin copolymer.

24. The film of claim 18 wherein the base layer comprises at most about 40% by weight of the base layer of the alpha-olefin/cyclic-olefin copolymer.

25. The film of claim 18 wherein the base layer comprises ethylene/norbornene copolymer.

26. The film of claim 18 further comprising a third layer comprising one or more tie polymers selected from ethylene/vinyl acetate copolymer, ethylene/(meth)acrylic acid copolymer, ethylene/$C_1$-$C_{12}$ alkyl (meth)acrylate copolymer, and polymers modified with unsaturated carboxylic acid anhydride.

27. The film of claim 26 wherein the third layer is between the skin and base layers.

28. The film of claim 18 wherein the total density of the film is less than about 1 g/cc.

29. The film of claim 18 wherein the Young's modulus of the film is at least about 150,000 psi.

30. The film of claim 18 wherein the free shrink in at least one direction is at least about 30%.

31. The film of claim 18 wherein the base layer comprises alpha-olefin/cyclic-olefin copolymer having a cyclic ring as part of the alpha-olefin/cyclic-olefin copolymer backbone.

32. A shrink sleeve comprising the film of claim 18.

33. A method of labeling a container comprising:
placing the shrink sleeve of claim 32 around the container; and
shrinking the shrink sleeve to conform the shrink sleeve to the container.

34. A film comprising:
a skin layer comprising one or more polymers selected from polystyrene and modified polyester; and
a base layer comprising one or more polymers selected from alpha-olefin/cyclic-olefin copolymer and alpha-olefin/vinyl aromatic copolymer, wherein:
the one or more polymers of the base layer have a glass transition temperature of at most about 45° C.;
the film has a free shrink at 100° C. in at least one direction of at least about 10%; and
the base layer further comprises alpha-olefin/cyclic-olefin copolymer having a glass transition temperature of at least about 60° C.

35. A film comprising:
a skin layer comprising one or more polymers selected from glycol-modified polyester and acid-modified polyester; and
a base layer comprising:
at least about 5% by weight of the base layer of one or more polymers selected from alpha-olefin/cyclic-olefin copolymer and alpha-olefin/vinyl aromatic copolymer, wherein the base layer comprises at most about 45% by weight of the base layer of the one or more polymers; and
at least about 50% by weight of the base layer of additional polymer selected from one or more of ethylene homopolymer, ethylene/alpha-olefin copolymer, polypropylene copolymer, and ethylene/unsaturated ester copolymer;

wherein the film has a free shrink at 100° C. in at least one direction of at least about 10%.

36. The film of claim 35 wherein the base layer comprises at most about 35% by weight of the base layer of the one or more polymers.

37. The film of claim 35 wherein the base layer comprises at most about 30% by weight of the base layer of the one or more polymers.

38. The film of claim 35 wherein the base layer comprises at most about 25% by weight of the base layer of the one or more polymers.

39. The film of claim 35 wherein the base layer comprises alpha-olefin/cyclic-olefin copolymer.

40. The film of claim 35 wherein the skin layer comprises glycol-modified polyester.

41. The film of claim 35 wherein the base layer comprises ethylene/norbornene copolymer.

42. The film of claim 35 further comprising a third layer comprising one or more tie polymers selected from ethylene/vinyl acetate copolymer, ethylene/(meth)acrylic acid copolymer, ethylene/$C_1$-$C_{12}$ alkyl (meth)acrylate copolymer, and polymers modified with unsaturated carboxylic acid anhydride.

43. The film of claim 35 wherein the total density of the film is less than about 1 g/cc.

44. The film of claim 35 wherein the base layer comprises alpha-olefin/cyclic-olefin copolymer formed by polymerization utilizing a carbon-carbon double bond that is within the alicyclic ring of a cyclic olefin monomer to produce a cyclic ring as part of the alpha-olefin/cyclic-olefin copolymer backbone.

45. A shrink sleeve comprising the film of claim 35.

46. A method of labeling a container comprising:
placing the shrink sleeve of claim 45 around the container; and
shrinking the shrink sleeve to conform the shrink sleeve to the container.

* * * * *